(12) United States Patent
Wuori

(10) Patent No.: US 6,567,758 B1
(45) Date of Patent: May 20, 2003

(54) ANALYSIS METHOD AND ANALYZER

(76) Inventor: Paul A. Wuori, Mantymaentie 12, FIN-02700 Kauniainen (FI)

( * ) Notice: Subject to any disclaimer, the term of this patent is extended or adjusted under 35 U.S.C. 154(b) by 0 days.

(21) Appl. No.: 09/868,445
(22) PCT Filed: Dec. 16, 1999
(86) PCT No.: PCT/FI99/01043
§ 371 (c)(1), (2), (4) Date: Jun. 18, 2001
(87) PCT Pub. No.: WO00/36378
PCT Pub. Date: Jun. 22, 2000

(30) Foreign Application Priority Data

Dec. 16, 1998 (FI) .................................................. 982717

(51) Int. Cl.$^7$ ............................................. G06F 19/00
(52) U.S. Cl. ...................................................... 702/56
(58) Field of Search ............................ 702/56, 50, 64, 702/43; 708/400, 401, 402, 403

(56) References Cited

U.S. PATENT DOCUMENTS

| 4,047,002 | A | | 9/1977 | Slaone et al. |
| 4,140,947 | A | * | 2/1979 | Gerry ...................... 315/209 R |
| 4,451,878 | A | | 5/1984 | Shigemasa |
| 4,674,029 | A | | 6/1987 | Maudal |

FOREIGN PATENT DOCUMENTS

| DE | 19619572 | 5/2000 |
| EP | 0760435 A3 | 3/1997 |

* cited by examiner

Primary Examiner—Michael Nghiem
(74) Attorney, Agent, or Firm—Skinner and Associates

(57) ABSTRACT

The invention relates to a method for analyzing and simulating various periodic phenomena, such as mechanical vibrations, temperature, pressure, fluid flows, electric currents or electric tensions, or similar as well as an analyzer suitable for this purpose. The analysis makes use of the Laplace transform with variables of complex numbers.

7 Claims, 6 Drawing Sheets

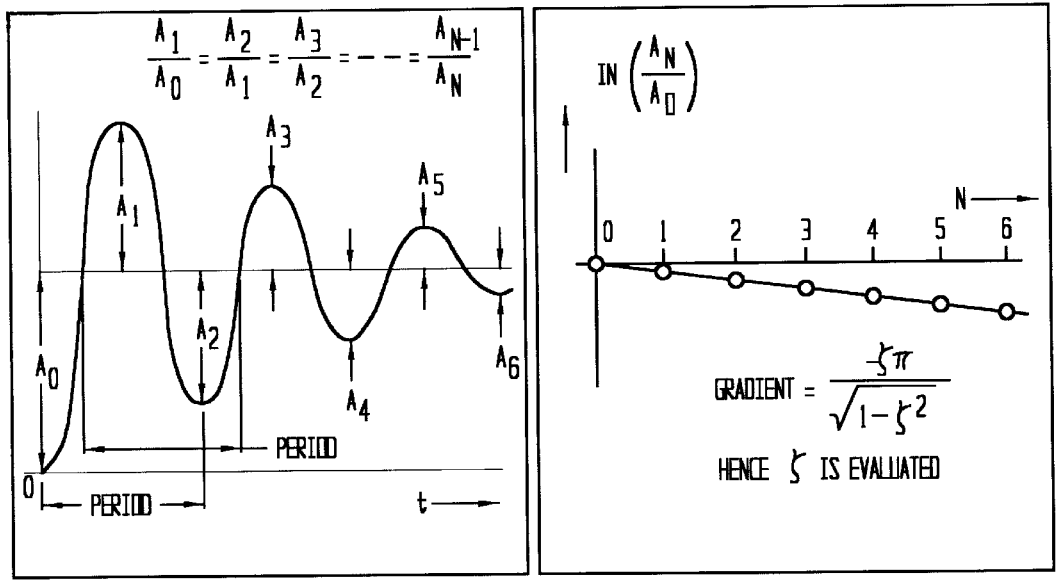
FIG. 1
FIG. 3
PRIOR ART
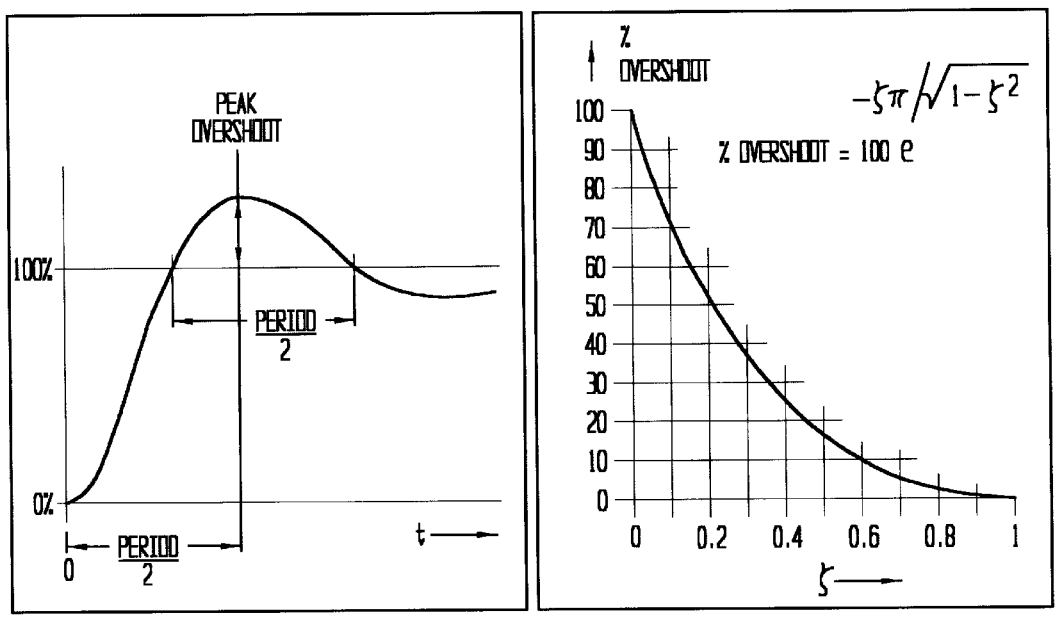
FIG. 2
FIG. 4
PRIOR ART

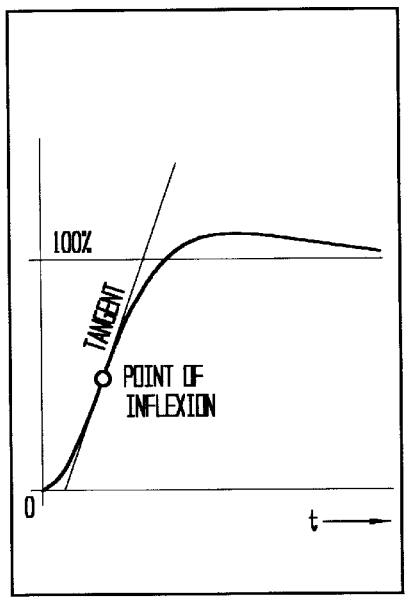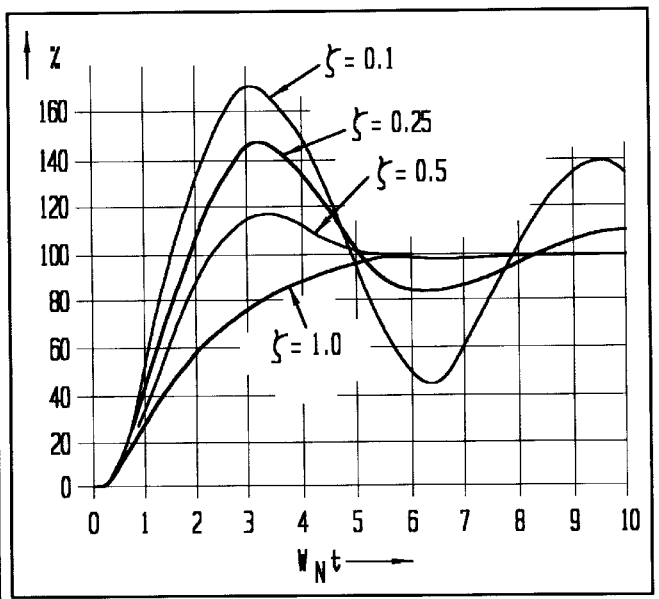
FIG. 5
PRIOR ART
FIG. 6
PRIOR ART

ANALYSIS METHOD AND ANALYZER

BACKGROUND OF THE INVENTION

The present invention relates to an analysis method and an analyzer for implementing the method, intended to analyze and simulate various periodic phenomena such as, mechanical vibrations, or variations in temperature, pressure, fluid flows, electric currents or electric voltages, or similar.

Though Laplace transformation has been traditionally used in frequency response analysis in particular, up until now step response analysis has had to resort to inaccurate graphical methods.

The testing of step response includes the recording of the dynamic behavior of an extremely simple test technique, as it is easy to use simple test equipment to suitably develop the required signals.

The level of difficulty of interpreting the experimental step responses depends of the level of the tested oscillator. A complex step response includes an additional series of time-dependent terms in the Laplace transfer function. As the number of terms is the level of the system, it is easy to show that, when the level of the system rises, it becomes increasingly difficult to use graphical means to resolve the response into components. If the components cannot be defined, it will be impossible to carry out quantitative calculations.

In typical first-degree growth and damping responses, the time constant is usually measured by taking the time required for the response to increase to 63% of its final size and damping to 37% of the initial value.

The interpretation of second or higher degree responses depends on the degree of damping present. In cases of weak or mediocre damping in responses of the second order, the damped specific angular velocity can be calculated, according to the state of the art, by measuring the oscillation period, as shown in FIGS. 1 and 2. Thus, $\omega_t = 2\pi/p$. Frequency $f_t = \omega/2\pi$.

FIGS. 3 and 4 show an alternative technique according to the state of the art for calculating the damping factor in weak and mediocre cases. FIG. 3 shows graphically the natural logarithm of each maximum and minimum, on the basis of the numerical position of the series of maximums and minimums, while FIG. 4 shows a standard curve of the peak maximums in relation to the damping factor, which is most suitably used in the central areas. The non-damped specific angular velocity can be obtained from equation (1):

$$\omega_n = \frac{\omega_t}{\sqrt{1+\zeta^2}}. \quad (1)$$

FIGS. 5 and 6 shows a case of strong damping, for which the most precise technique is to construct a tangent to the point of inflexion. The position of this tangent can be applied to the corresponding tangent for each standard square response curve. Interpolation can be used where necessary to obtain the most suitable non-damped angular velocity $\omega_n$ and damping $\zeta$ values from the curve.

The graphical interpretation of higher-degree step responses can be highly unreliable or even impossible. While it may be possible to identify the transfer function by appropriately using a computer and applying numerical analysis and curve fitting, it is usual to use the more comprehensive frequency response analysis, instead of analyzing the step response.

BRIEF SUMMARY OF THE INVENTION

The present invention is intended to eliminate the many defects referred to above in the analysis of step or other response, and to allow rapid and precise response analysis, so that the analysis will be able to be used in many fields of technology, in which the deficient art has so far prevented its use.

Thus, the method of analysis in this invention has been developed to solve the problems in the characteristic manner disclosed in the accompanying Claims.

The general feature of the invention can be described briefly as follows.

According to the invention, the measured step response is transformed into an illustrative form, by means of a new integral transformation. Whereas up until now Laplace transformation in particular has been used when analyzing frequency response, and imprecise graphical methods have been resorted to in cases of step response, the transformation used in this invention can be called Fourier-Laplace transformation.

Step response, which can sometimes be extremely complex, can be expressed explicitly using the transformation referred to above, with the aid of a mathematical function. Whereas so far it has only been possible to analyze the step responses created by a single damping sine wave, it is possible, according to the invention to form a series of simple damping sine waves and use this as a base for analysis. Each term in the series is the solution of a linear differential equation, so that an unknown function can be expressed using superposition, i.e. as the sum of the simple sine waves that have been discovered. The analysis expresses each term's angular velocity $\omega$, damping $\zeta$, starting time $t_s$ and steady-state value $Y_\infty$, thus completely defining the damping sine wave.

This method can be used to analyze practically any step response whatever, simulate it precisely, and state the final result as a mathematical formula. Thus, the invention need not be limited to any specific technical application, but can be applied in very many fields of technology, medical science, and to other applications. The invention also allows a future transfer to the use of step response analysis, which is considerably cheaper than frequency response to use.

The accompanying drawings illustrate the invention and the state of the art. The state of the art has already been described above.

BRIEF DESCRIPTION OF THE DRAWINGS

Thus

FIGS. 1 and 2 show weak or mediocre damping in a second-degree response and its solution, according to the state of the art;

FIGS. 3 and 4 show a method, according to the state of the art, for calculating a damping factor;

FIGS. 5 and 6 also show a method according to the state of the art for solving angular velocity and the damping factor in a case of strong damping;

DETAILED DESCRIPTION OF THE INVENTION

The following describes many aspects of the invention, and particularly the details of its mathematical solution. When necessary, references are made especially to FIG. 7 and the subsequent figures.

According to the invention, a data collection system is used, in which sensors 2 record data. The system can have many sensors operating simultaneously. The sensor measures the momentary values of the quantity being investigated, converts them to electrical impulses, digitizes them, and records them in a file as a list of value pairs. The value pair's first number, i.e., the argument of the step response function, is usually time. To simplify matters, it will be assumed to be time in the following. The second number of the value pair is the measured quantity.

Figure 7:
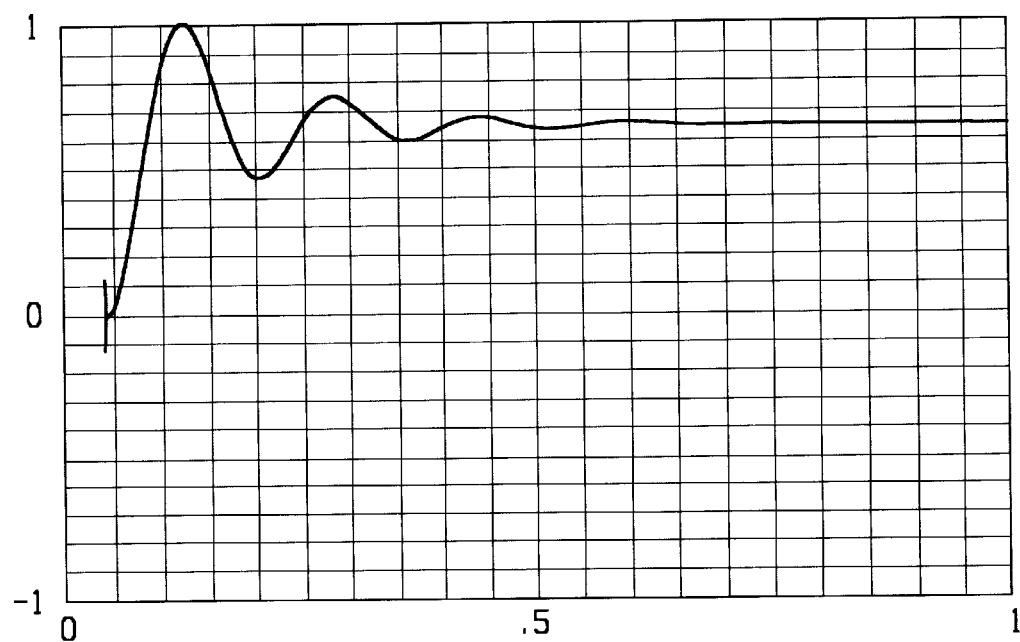
FIG. 7 shows a simple step-response curve.

FIG. 7 shows a simple step response, formed by a single damping sine curve. The horizontal axis is time and the vertical the deviation. The curve is theoretical, but may represent a pendulum in a medium or the position of a cantilever beam, after it has been moved from a state of equilibrium and then released.

Figure 8:
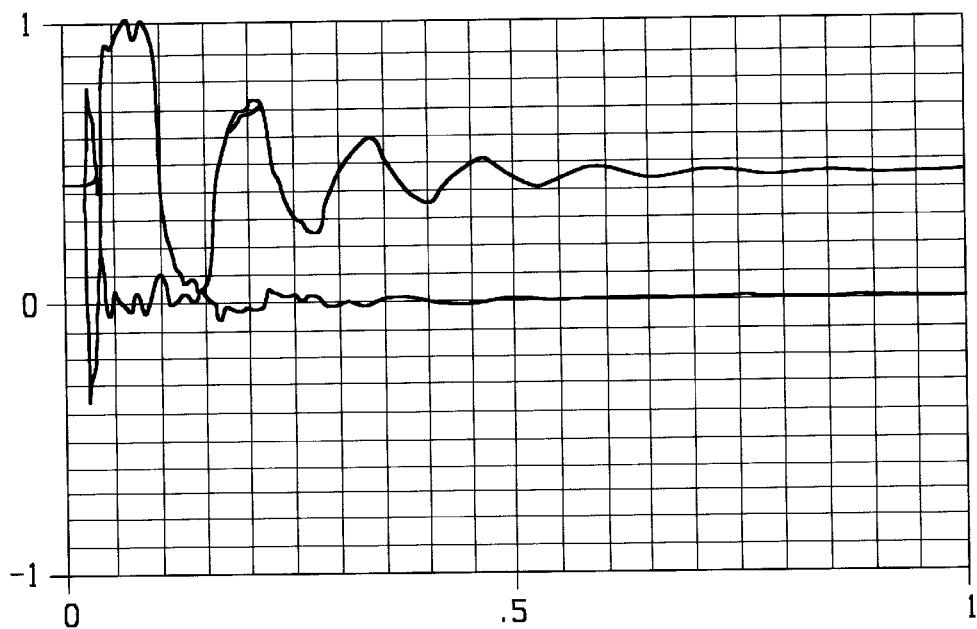
FIG. 8 shows the step-response curve in a case, in which water flows in a pipe and the flow is suddenly cut off.

FIG. 8 shows a much more complex event. It concerns the pressure variation in a pipe, in which water flows. A valve at the end of the pipe is shut quickly. The pressure variation is due to many oscillations, the most important being the pressure wave traveling in the water. The step response is also affected by the valve body bulging and pressure waves due to the pipe deforming. Oscillations from the water and pipe also move to the tank, from which water flows to the pipe. The analyzer found 24 different oscillations from this step response, at least 5 of which depict the water's behavior. Hitting the empty pipe's end with a rubber hammer created a step response, comparison with the original step response identifying 8 of them as belonging to the pipe or tank.

Figure 9:
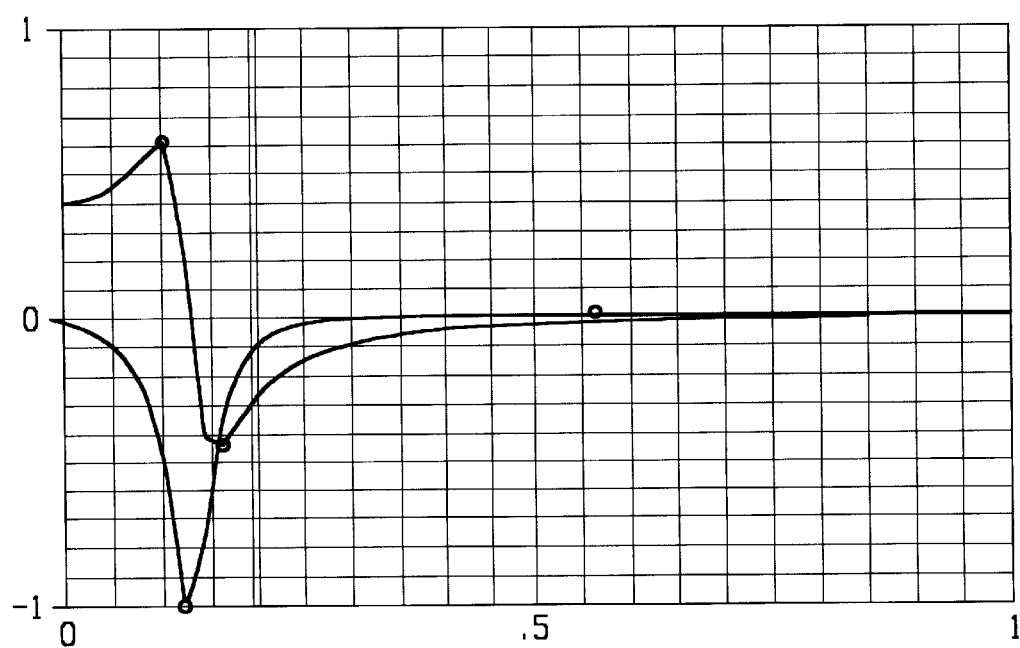
FIG. 9 shows the transformation curve of the case in FIG. 7.
Figure 10:
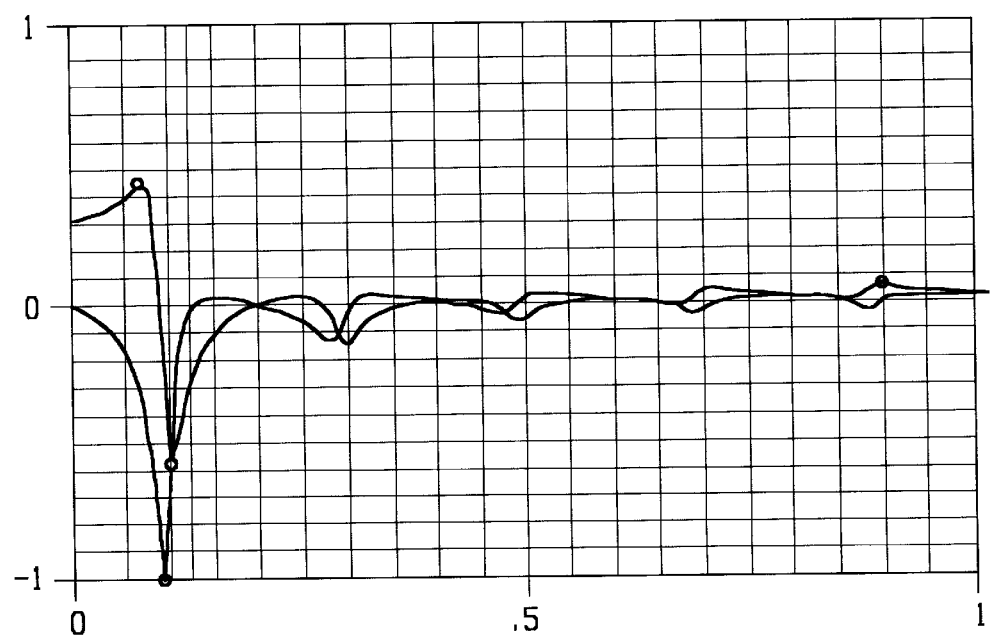
FIG. 10 shows the transformation curve in the case in FIG. 8.

FIG. 9 shows FIG. 7's transformation curve and FIG. 10 the corresponding curve for FIG. 8.

Several sensors can be used simultaneously to study complex oscillators, such as the above tank, a turbine vane, or a combustion engine crankshaft, the time reading being entered to the files from a single source simultaneously with the displacements from the various sensors. Thus, the frequencies, damping, amplitudes, and phase angles at different points of a vane can be found. These allow the forms of oscillation in the vane to be identified and the vane's oscillation even to be shown in animation.

The method and analyzer according to the invention are very useful for studying control circuits, as the frequency response analyses presently used do not depict systems as completely as step-response analysis.

Obviously, a computer 1 with a suitable data-processing processor is used in practical embodiments of the invention. The various data obtained are entered in the system, which analyzes them and gives the result as a series of harmonically damping oscillations. By summing the terms of the series, the oscillation studied can be simulated with a mathematical formula.

The computer equipment can either be permanently connected to the data collection system or can be independent. The latter arrangement saves time in research involving large series of measurements, as these are usually rapid, while analysis of the results takes longer. Conventionally, the computer need not be supervised, instead large numbers of files can be entered for analysis, e.g. at night.

As stated above, the method and analyzer according to the invention can also be utilized in medical research. An electrocardiogram (ECG) is one such example demanding rapid analysis, so that the analysis equipment is permanently connected to the ECG apparatus. In this special case, a result-evaluation program can be added to the analysis program, to give a preliminary result while the patient is still in the examination room.

An embodiment of the method according to the invention uses an integral transformation described by the following equation (2):

$$f(s, \sigma) + i\varphi(s, \sigma) = \int_{t_a}^{t_l} e^{-(s+i\sigma)t} y(t) dt. \qquad (2)$$

This is a Laplace transform, differing from a normal one in that the Laplace variable s has been replaced with a complex number s+iσ. Thus, the transform is also a complex number, which we will call f+iφ The real and imaginary components are separated, the imaginary component being reduced by i, to give two integral transforms (3) and (4):

$$f = \int_{t_a}^{t_l} e^{-st} y(t)\cos(\sigma t) dt \qquad (3)$$

$$\text{and} \quad \varphi = -\int_{t_a}^{t_l} e^{-st} y(t)\sin(\sigma t) dt. \qquad (4)$$

in which f and φ are the transforms, t the argument of the transformable function, i.e. time, y the transformable function, s and σ free variables, with the dimension 1/s, and $t_a$ and $t_l$ the starting and ending times of the integral transformation. The analysis is based on using these transforms.

At this stage in the analysis, the tabled function y(t) is integrated numerically from the value $t_a$ of the argument to the value $t_l$ by means of equations (3) and (4) while the free variables s and σ remain constant. Thus, a single value is obtained for both function f(s,σ) and φ(s,σ). The numerical integration continues for various values of σ while s remains constant. The transforms and their corresponding values of σ are placed as value pairs in the files. The initial value of σ is usually zero, as is the value of s at this stage of the analysis. The final value of σ can be chosen, but it has a maximum value, which depends on the density of the tabled values of the function y(t) being analyzed.

The descriptors of the transforms are drawn in a set of co-ordinates, with the transform as the ordinate and σ as the abscissa.

FIG. 9 shows the integral transform curves, showing a single resonance point, of the simple sine wave of FIG. 7. FIG. 10, in which the simple sine waves' resonance points are clearly visible, shows the step-response transform curves of FIG. 8. The resonance points' frequencies form a series 1, 3, 5, 7, . . . etc. in relation to the frequency of the main wave.

Both transforms f and φ have two extreme values at the resonance point, but one of these four values may be so far from the other three that it cannot be determined by numerical integration. The argument values of the extreme values can be used to define, one at a time, the frequency, damping, and phase angle of the simple sine waves forming the series.

Figure 11:
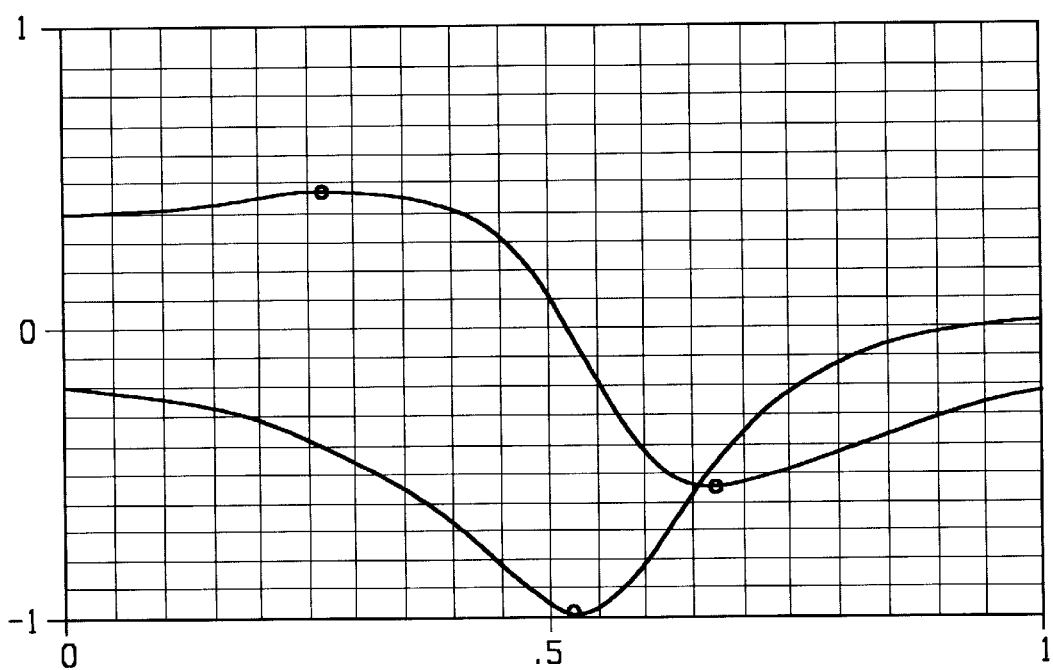
FIG. 11 shows a window from the previous curve, used according to the invention.
Figure 12:
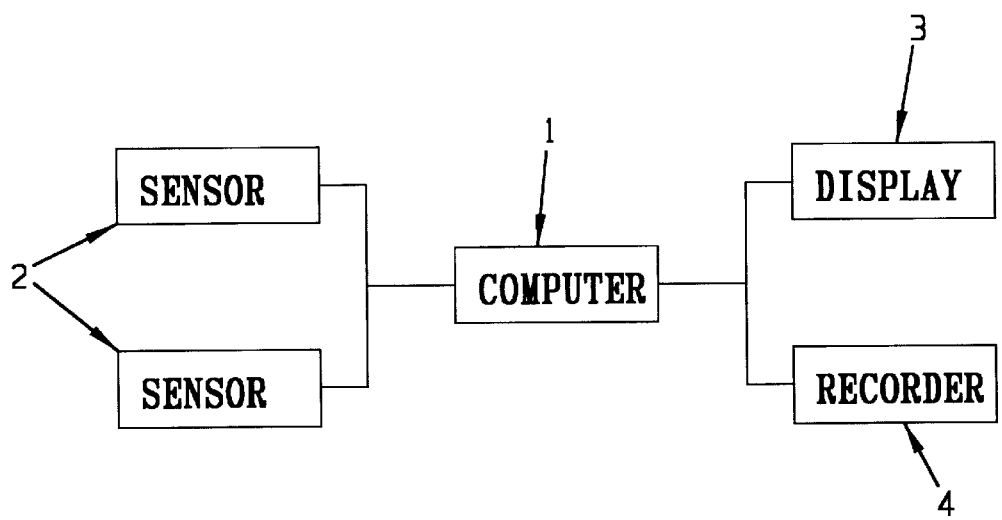
FIG. 12 shows an analyzer of the present invention.

After scanning, a small section of, e.g., FIG. 10 is selected, to show the extreme values of only a single wave in the window thus formed, as shown in FIG. 11. Usually, the computer equipment can do this automatically. If the two waves are close to each other, it may be difficult to form a window. Therefore the boundaries of the window can also be selected manually.

As in the scan, $\sigma$ is given different values while s remains constant, but at the extreme value focusing takes place by iteration, i.e. by reducing the steps of $\sigma$, to achieve the greatest possible precision.

At this stage the $\sigma$-value of only three extreme values is focused.

As a reference point, the function depicting the damping sine wave is selected, the value $t_0$ of its argument giving the value $-y_\infty$ and its derivative for the same argument value being zero, i.e.: $y(t)$ $$y(t) = -y_\infty e^{-\zeta(t-t_0)}\left\{\cos[\omega(t-t_0)] + \frac{\zeta}{\omega}\sin[\omega(t-t_0)]\right\} \quad (5)$$

the derivative of which is $$\dot{y} = \frac{y_\infty(\omega^2 + \zeta^2)}{\omega} e^{-\zeta(t-t_0)}\sin[\omega(t-t_0)]. \quad (6)$$

In the equations, $\zeta$ is the damping and $\omega$ the angular velocity.

By substituting y from equation (5) in equations (3) and (4), we obtain the expressions f and $\varphi$ in integral form:

$$f = \frac{y_\infty e^{\zeta t_0}}{\omega}\int_{t_0}^{t_1} e^{-(a+\zeta)t}\cos(\sigma t)\{\omega\cos[\omega(t-t_0)] + \zeta\sin[\omega(t-t_0)]\}dt \quad (7)$$

and $$\varphi = \frac{y_\infty e^{\zeta t_0}}{\omega}\int_{t_0}^{t_1} e^{-(a+\zeta)t}\sin(\sigma t)\{\omega\cos[\omega(t-t_0)] + \zeta\sin[\omega(t-t_0)]\}dt. \quad (8)$$

We integrate and separate the real and imaginary components, obtaining the f- and $\varphi$-functions.

$$f = \frac{y_\infty e^{\zeta t_0}}{2\omega}\Bigg\{\Bigg\{-\frac{e^{-(s+\zeta)t_1}}{(s+\zeta)^2 + (\sigma-\omega)^2}[[\zeta(a+\zeta) + \quad (9)$$

$\omega(\sigma-\omega)]\sin[(\sigma-\omega)t_1 + \omega t_0] +$ $[\zeta(\sigma-\omega) - \omega(s+\zeta)]\cos[(\sigma-\omega)t_1 + \omega t_0]] +$ $\frac{e^{-(s+\zeta)t_n}}{(s+\zeta)^2 + (\sigma-\omega)^2}[[\zeta(s+\zeta) + \omega(\sigma-\omega)]\sin[(\sigma-\omega)t_n + \omega t_0] -$ $\{\zeta(\sigma-\omega) - \omega(s+\zeta)\}\cos[(\sigma-\omega)t_n + \omega t_0]] +$ $\frac{e^{-(s+\zeta)t_1}}{(s+\zeta)^2 + (\sigma+\omega)^2}[[\zeta(s+\zeta) - \omega(\sigma+\omega)]\sin[(\sigma+\omega)t_1 - \omega t_0] +$ $[\zeta(\sigma+\omega) + \omega(s+\zeta)]\cos[(\sigma+\omega)t_1 - \omega t_0]] -$ $\frac{e^{-(s+\zeta)t_n}}{(s+\zeta)^2 + (\sigma+\omega)^2}[[\zeta(s+\zeta) - \omega(\sigma+\omega)]\sin[(\sigma+\omega)t_n - \omega t_0] +$ $[\zeta(\sigma+\omega) + \omega(s+\zeta)]\cos[(\sigma+\omega)t_n - \omega t_0]]\Bigg\}$ and $$\varphi = \frac{y_\infty e^{\zeta t_0}}{2\omega}\Bigg\{\Bigg\{-\frac{e^{-(s+\zeta)t_1}}{(s+\zeta)^2 + (\sigma-\omega)^2}[[\zeta(a+\zeta) + \quad (10)$$

$\omega(\sigma-\omega)]\cos[(\sigma-\omega)t_t + \omega t_0] +$ $[\zeta(\sigma-\omega) - \omega(s+\zeta)]\sin[(\sigma-\omega)t_1 + \omega t_0]] +$ $\frac{e^{-(s+\zeta)t_n}}{(s+\zeta)^2 + (\sigma-\omega)^2}[[\zeta(s+\zeta) + \omega(\sigma-\omega)]\cos[(\sigma-\omega)t_n + \omega t_0] -$ $\{\zeta(\sigma-\omega) - \omega(s+\zeta)\}\sin[(\sigma-\omega)t_n + \omega t_0]] +$ $\frac{e^{-(s+\zeta)t_1}}{(s+\zeta)^2 + (\sigma+\omega)^2}[[\zeta(s+\zeta) - \omega(\sigma+\omega)]\cos[(\sigma+\omega)t_1 - \omega t_0] -$ $[\zeta(\sigma+\omega) + \omega(s+\zeta)]\sin[(\sigma+\omega)t_1 - \omega t_0]] -$ $\frac{e^{-(s+\zeta)t_n}}{(s+\zeta)^2 + (\sigma+\omega)^2}[[\zeta(s+\zeta) - \omega(\sigma+\omega)]\cos[(\sigma+\omega)t_n - \omega t_0] -$ $[\zeta(\sigma+\omega) + \omega(s+\zeta)]\sin[(\sigma+\omega)t_n - \omega t_0]]\Bigg\}.$ When (9) and (10) are derived in relation to $\sigma$, we obtain the partial derivatives (11) and (12):

$$\frac{\partial f}{\partial \sigma} = \frac{y_\infty e^{\zeta t_0}}{2\omega}\Bigg\{-\frac{e^{-(s+\zeta)t_1}}{([(s+\zeta)^2 + (\sigma-\omega)^2])^2}\{\{t_1[(s+\zeta)^2 + \quad (11)$$

$(\sigma-\omega)^2][\omega(s+\zeta) - \zeta(\sigma-\omega)] + \omega[(s+\zeta)^2 - (\sigma-\omega)^2] -$ $2\zeta(s+\zeta)(\sigma-\omega)\}\sin[(\sigma-\omega)t_1 + \omega t_0] + \{t_1[(s+\zeta)^2 +$ $(\sigma-\omega)^2][\zeta(s+\zeta) + \omega(\sigma-\omega)] + \zeta[(s+\zeta)^2 - (\sigma-\omega)^2] +$ $2\omega(s+\zeta)(\sigma-\omega)\}\cos[(\sigma-\omega)t_1 + \omega t_0]) +$ $\frac{e^{-(s+\zeta)t_n}}{[(s+\zeta)^2 + (\sigma-\omega)^2]^2}(\{t_a[(s+\zeta)^2 + (\sigma-\omega)^2][\omega(s+\zeta) -$ $\zeta(\sigma-\omega)] + \omega[(s+\zeta)^2 - (\sigma-\omega)^2] -$ $2\zeta(s+\zeta)(\sigma-\omega)\}\sin[(\sigma-\omega)t_n + \omega t_0] + \{t_n[(s+\zeta)^2 +$ $(\sigma-\omega)^2][\zeta(s+\zeta) + \omega(\sigma-\omega)] + \zeta[(s+\zeta)^2 - (\sigma-\omega)^2] +$ $2\omega(s+\zeta)(\sigma-\omega)\}\cos[(\sigma-\omega)t_\zeta + \omega t_0]) -$ $\frac{e^{-(s+\zeta)t_n}}{[(s+\zeta)^2 + (\sigma-\omega)^2]^2}(\{t_1[(s+\zeta)^2 + (\sigma+\omega)^2][\omega(s+\zeta) +$ $\zeta(\sigma+\omega)] + \omega[(s+\zeta)^2 - (\sigma+\omega)^2] +$ $2\zeta(s+\zeta)(\sigma+\omega)\}\sin[(\sigma+\omega)t_1 - \omega t_0] - \{t_1[(s+\zeta)^2 +$ $(\sigma+\omega)^2][\zeta(s+\zeta) - \omega(\sigma+\omega)] + \zeta[(s+\zeta)^2 - (\sigma+\omega)^2] -$ $2\omega(s+\zeta)(\sigma+\omega)\}\cos[(\sigma+\omega)t_1 - \omega t_0]) +$ $\frac{e^{-(s+\zeta)t_n}}{[(s+\zeta)^2 + (\sigma-\omega)^2]^2}(\{t_n[(s+\zeta)^2 + (\sigma+\omega)^2][\omega(s+\zeta) +$ $\zeta(\sigma+\omega)] + \omega[(s+\zeta)^2 - (\sigma+\omega)^2] +$ $2\zeta(s+\zeta)(\sigma+\omega)\}\sin[(\sigma+\omega)t_n - \omega t_0] - \{t_n[(s+\zeta)^2 +$ $(\sigma+\omega)^2 + (\sigma+\omega)^2][\zeta(s+\zeta) - \omega(\sigma+\omega)] + \zeta[(s+\zeta)^2 +$ $(\sigma+\omega)^2] - 2\omega(s+\zeta)(\sigma+\omega)\}\cos(\{\sigma+\omega)t_n - \omega t_0])\Bigg\},$ $$\frac{\partial \varphi}{\partial \sigma} = \frac{y_\infty e^{\zeta t_0}}{2\omega}\Bigg\{-\frac{e^{-(s+\zeta)t_1}}{([(s+\zeta)^2 + (\sigma-\omega)^2))^2}\{\{t_1[(s+\zeta)^2 + \quad (12)$$

$(\sigma-\omega)^2][\omega(s+\zeta) - \zeta(\sigma-\omega)] + \omega[(s+\zeta)^2 - (\sigma-\omega)^2] -$ $2\zeta(s+\zeta)(\sigma-\omega)\}\cos[(\sigma-\omega)t_1 + \omega t_0] - \{t_1[(s+\zeta)^2 +$ -continued $$(\sigma - \omega)^2][\zeta(s + \zeta) + \omega(\sigma - \omega)] + \zeta[(s + \zeta)^2 - (\sigma - \omega)^2] +$$

$$2\omega(s + \zeta)(\sigma - \omega)\}\sin[(\sigma - \omega)t_1 + \omega t_0]) +$$

$$\frac{e^{-(s+\zeta)t_n}}{[(s+\zeta)^2 + (\sigma - \omega)^2]^2}(\{t_a[(s+\zeta)^2 + (\sigma - \omega)^2][\omega(s+\zeta) -$$

$$\zeta(\sigma - \omega)] + \omega[(s+\zeta)^2 - (\sigma - \omega)^2] -$$

$$2\zeta(s+\zeta)(\sigma-\omega)\}\cos[(\sigma-\omega)t_n + \omega t_0] + \{t_n[(s+\zeta)^2 +$$

$$(\sigma-\omega)^2][\zeta(s+\zeta) + \omega(\sigma-\omega)] + \zeta[(s+\zeta)^2 - (\sigma-\omega)^2] +$$

$$2\omega(s+\zeta)(\sigma-\omega)\}\sin[(\sigma-\omega)t_n + \omega t_0]) -$$

$$\frac{e^{-(s+\zeta)t_n}}{[(s+\zeta)^2 + (\sigma - \omega)^2]^2}(\{t_1[(s+\zeta)^2 + (\sigma + \omega)^2][\omega(s+\zeta) +$$

$$\zeta(\sigma+\omega)] + \omega[(s+\zeta)^2 - (\sigma+\omega)^2] +$$

$$2\zeta(s+\zeta)(\sigma+\omega)\}\cos[(\sigma+\omega)t_1 - \omega t_0] - \{t_1[(s+\zeta)^2 +$$

$$(\sigma+\omega)^2][\zeta(s+\zeta) - \omega(\sigma+\omega)] + \zeta[(s+\zeta)^2 - (\sigma+\omega)^2] -$$

$$2\omega(s+\zeta)(\sigma+\omega)\}\sin[(\sigma+\omega)t_1 - \omega t_0]) +$$

$$\frac{e^{-(s+\zeta)t_n}}{[(s+\zeta)^2 + (\sigma - \omega)^2]^2}(\{t_1[(s+\zeta)^2 + (\sigma + \omega)^2][\omega(s+\zeta) +$$

$$\zeta(\sigma+\omega)] + \omega[(s+\zeta)^2 - (\sigma+\omega)^2] +$$

$$2\zeta(s+\zeta)(\sigma+\omega)\}\cos[(\sigma+\omega)t_n - \omega t_0] - \{t_n[(s+\zeta)^2 +$$

$$(\sigma+\omega)^2 + (\sigma+\omega)^2][\zeta(s+\zeta) - \omega(\sigma+\omega)] + \zeta[(s+\zeta)^2 -$$

$$(\sigma+\omega)^2] - 2\omega(s+\zeta)(\sigma+\omega)\}\sin(\{\sigma+\omega)t_n - \omega t_0])\},$$

Thus, the analysis of a single harmonic oscillation gives four extreme values, one of which is usually difficult to find.

First of all, approximate values must be found for $\omega$, $\zeta$, and $t_0$, after which a more precise analysis can be made. Approximate values are obtained for the essential component of the partial derivatives (11) and (12), if the zero point of the time axis is set at point $t_a$, i.e.

$$\frac{\partial f}{\partial \sigma} = 0, \frac{\partial \varphi}{\partial \sigma} = 0 \quad kun \quad t_a = 0. \tag{13}$$

The simplified equations for the partial derivatives are as follows:

$$\frac{\partial f}{\partial \sigma} = \frac{y_\infty e^{\zeta t_0}}{2\omega[(s+\zeta)^2 + (\sigma-\omega)^2)^2}\{\{\omega[(s+\zeta)^2 - (\sigma-\omega)^2] - \tag{14}$$

$$2\zeta(s+\zeta)(\sigma-\omega)\}\sin(\omega t_0) + \{\zeta[(s+\zeta)^2 - (\sigma-\omega)^2] +$$

$$2\omega(s+\zeta)(\sigma-\omega)\}\cos(\omega t_0)\}$$

and $$\frac{\partial \varphi}{\partial \sigma} = \frac{y_\infty e^{\zeta t_0}}{2\omega[(s+\zeta)^2 + (\sigma-\omega)^2)^2}\{\{\omega[(s+\zeta)^2 - (\sigma-\omega)^2] - \tag{15}$$

$$2\zeta(s+\zeta)(\sigma-\omega)\}\cos(\omega t_0) + \{\zeta[(s+\zeta)^2 - (\sigma-\omega)^2] +$$

$$2\omega(s+\zeta)(\sigma-\omega)\}\sin(\omega t_0)\},$$

from which we obtain the values of the arguments of the extreme values:

$$\begin{cases} \sigma_{f_+} = \omega - (s+\zeta)\left[\dfrac{\zeta\sin(\omega t_0) - \omega\cos(\omega t_0) + \sqrt{\zeta^2 + \omega^2}}{\omega\sin(\omega t_0) + \zeta\cos(\omega t_0)}\right] \\ \sigma_{f_-} = \omega - (s+\zeta)\left[\dfrac{\zeta\sin(\omega t_0) - \omega\cos(\omega t_0) - \sqrt{\zeta^2 + \omega^2}}{\omega\sin(\omega t_0) + \zeta\cos(\omega t_0)}\right] \\ \sigma_{\varphi_+} = \omega - (s+\zeta)\left[\dfrac{\omega\sin(\omega t_0) + \zeta\cos(\omega t_0) + \sqrt{\zeta^2 + \omega^2}}{\zeta\sin(\omega t_0) - \omega\cos(\omega t_0)}\right] \\ \sigma_{\varphi_-} = \omega + (s+\zeta)\left[\dfrac{\omega\sin(\omega t_0) + \zeta\cos(\omega t_0) - \sqrt{\zeta^2 + \omega^2}}{\zeta\sin(\omega t_0) - \omega\cos(\omega t_0)}\right] \end{cases} \tag{16}$$

in which the lower index f refers to the function f(s,σ), φ refers to the function φ(s,σ), + the maximum, and − the minimum.

We have four equations and only three unknowns: ω, ζ, and $t_0$. Often it is possible to find only three extreme values, so that a choice must be made between four different solutions, depending on which extreme value is missing. The expressions of the solutions are complex.

The above equations give only approximate values for angular velocity ω, damping ζ, and starting time $t_0$. More precise values are obtained using relaxation: small changes are made one at a time in the above quantities, until the arguments of the extreme values coincide as closely as possible with those measured.

After this, $y_\infty$ is given different values, to fit the simulated function as closely as possible to the measured value. By comparing the simulated function to the measured function for the various values of σ inside the window, the average error of the sum of the square of the errors is obtained.

Generally, the simulation referred to above is not the best possible. The value of the free real variables influences the final result, as it changes the shape of the transformation curve. By reducing the s variable of the small step Δs and repeating the previous simulation, the average error may diminish. If the error diminishes, the process is continued until the error begins to increase. If, at the first attempt, the error increases, iteration is continued in the opposite direction, until the optimum is found.

Next, the simple damped sine wave obtained by simulation is deducted from the original, tabled function y(t), after which the remainders are eliminated in the next scan of the sine wave, after focusing and identification etc., until the desired number have been eliminated.

During analysis, all the values found for ω, ζ, $t_0$, and $y_\infty$ are tabled. The original function y(t) is simulated as the sum of the waves obtained.

The following deals with numerous aspects of the method according to the invention, to clarify the variations and models of the operation as a whole. The disclosure naturally also includes such descriptions that will be trivial to one versed in the art, and which are therefore not dealt with exhaustively, but only in outline.

The program relating to the method according to the invention can be run in three different ways: by selecting manually one at a time the frequency zones (windows) to be investigated, or by selecting them at one time after the first sweep, or by allowing the computer itself to select the frequency areas. The files can be entered in the analyzer either so that the computer analyses one file at a time, draws the original curve, the simulated curve on top of it, and finally the difference between them, i.e. the error curve. If requested, the computer will give the parameters of the waves found, either on the display 3 or on paper via a recorder 4. Another possibility is to enter many files one after the other. In this case, the computer analyses all the files one at a time, saves the result in the files, and finally draws the curves of the last file. A display program can be used to have the curves drawn later on the display and to output the parameters either on the display or on paper.

The curve depicting the file always begin with a straight section, which must not be included in the analysis, as the analyzer would then try to simulate it too, which would naturally lead to an erroneous result. The point, from which the analysis will start, must be selected. The first point of the actual step response is not always the best possible, because at this point the derivative of the function y(t) is often zero, so that $t_0$ will be imprecise. The selection can be made manually or left for the computer to carry out automatically. In the latter case, the user can set values to determine how the file will be reduced.

If, in the analysis method according to the invention, the number of the waves to be eliminated is not limited, the computer will not stop or the analysis will continue for a very long time. If the user has given a very small number for the set value, the computer will stop and state the final result. However, this result is not, in fact, final, because the residual curve is located in a separate file. Other numbers necessary for the analysis to continue also come to this file. Next, the user need only enter the above file, when the analysis continues and the computer gives the correct number for the next wave.

If many waves must be eliminated, and especially if two waves have almost the same frequency, the transformation functions of the neighboring waves will interfere with each other. The transformation waves will overlap and their common extreme values will not be in the same place as they would be if the waves were alone.

Once the desired number of waves has been eliminated, one wave at a time can be added to the residual curve and then eliminated. The result will be better, because the interference from neighboring curves will have nearly disappeared. The set value determines how many times the original elimination cycle will be repeated.

If necessary, the files can be edited. The straight section demanded by the analyzer can be added from the file to the start of the curve. In addition, the measured damping oscillation will often have an unnecessarily long curve, requiring shortening from the end. There will also often be too many measurement points, which does not improve the final result, but only lengthens the calculation time. Here, the number of value pairs can be cut to a half, one-third, one-quarter, etc. The file can also be renamed.

Noise is eliminated, by calculating the value of the function as the average of a number, determined by the set value, of sequential values of the function. E.g., if the set value is five, the computer will begin from the first five value pairs by calculating the averages of both the function and the argument, to form the first value pair of a new file. Next, the computer will eliminate the first value pair from the queue of five and add the sixth, after which it will again calculate the averages and add the value pair thus obtained to the new file, and so on.

If the damping step response is relatively rapid, it is not difficult to calculate the continuity state. A special program can be used to determine from what point the step response is nearly straight, and a set value selected that will eliminate value pairs from the start of the file up to this point, when the continuity state is calculated.

If, on the other hand, there is no damping, care must be taken that the end includes a whole number of main wave oscillations, otherwise the continuity state error may be very large.

If, in the direction of the transformation function argument, there is the minimum of another transformation function on one side of an individual extreme value and the maximum on the other, the frequency area limited by the window is determined so that the co-ordinate of the center-point of the area is the average of the arguments of three extreme values, its width being defined by the set value.

The set value can be used to determine the number of steps for the maximal frequency area. If a frequency area smaller than the maximal is selected for the sweep, the number of steps will diminish correspondingly. Calculation time can be saved by keeping the number of steps in the sweep relatively small.

The real argument affects the transformation function. The optimum solution can be found by varying it. The initial value should be close to the final value, as the initial value also effects the final result. For a good final result, the sum of the real argument and the damping should usually be about 0, 1 . . . 0, 5.

It will not always be appropriate to sweep over the entire frequency area, as it will sometimes be wished to limit it. If it is wished to limit it from the start, i.e. to leave out slow oscillations, the set value is given a value >0 and <1. If, for instance, it is 0,25, the first quarter will be left out of the analysis.

As above, the set value is given a value between zero and unity. If the previous set value is still 0,25 and this one is 0,6, the analysis will take place in an area starting from 25% from the start and ending 60% from the end.

To save time, it is sometimes necessary to limit analysis. This can be done, if, for instance, the file contains many waves of greatly varying frequency, by analyzing only a predetermined number of oscillations (cycles).

Time can also be saved by leaving out every second or more value pairs, when analyzing slow oscillations. If there are 15, 20 degrees between the measurement points of a single complete oscillation, a smaller interval will not significantly improve the result.

In a window, the transformation function step must be smaller than that in a sweep. The drawn curve should be evenly rounded, with no sharp corners visible. Fifty is usually a suitable number of steps.

If there are many extreme values in the window, the computer tries different combinations by selecting the largest extreme values of the absolute value of the function as the lone extreme value. Thus, the point of departure is formed by the largest maximum and the smallest minimum of function f and the largest maximum and smallest minimum of function $\phi$. The computer tries to fit the extreme values of the second function to these. The combination that best eliminates the wave is saved and this elimination attempt remains in force.

To avoid grouping, the window should be relatively small, though this brings the danger that only two extreme values will be in the window. This will not stop the analysis, however, as the computer then selects a new and larger window. The user can choose how many times the window will be enlarged.

The computer must be given an absolute limit as to when a wave is eliminated, as otherwise a situation will sometimes arise, in which the best combination in grouping will be obviously erroneous. The elimination of an erroneous wave will spoil subsequent elimination attempts, because the elimination of an erroneous wave means that it will be added, as an example, to the original step response.

What is claimed is:

1. A method for analyzing and simulating period phenomena, such as mechanical vibrations and variations in temperature, pressure, fluid flows, electric currents or electric tensions, comprising the steps:

generating an integral transform (2) by replacing the Laplace variable s in the conventionally used Laplace transform (0):

$$f(s) = \int_{t_a}^{t_l} e^{-st} y(t) dt \qquad (0)$$

with the complex number s+iσ, giving:

$$f(s, \sigma) + i\varphi(s, \sigma) = \int_{t_a}^{t_l} e^{-(s+i\sigma)t} y(t) dt \qquad (2)$$

dividing the transform (2) into real and imaginary components, reducing the imaginary component by i giving two integral transforms (3) and (4):

$$f = \int_{t_a}^{t_l} e^{-st} y(t)\cos(\sigma t) dt \qquad (3)$$

and $$\varphi = -\int_{t_a}^{t_l} e^{-st} y(t)\sin(\sigma t) dt \qquad (4)$$

in which f and φ are transformation functions, t is the argument of the transformable function, y is a transformable function, s and σ are free variables, and $t_a$ and $t_l$ are the times of the start and end of the integral transformation, and resolving properties characterizing response curves using the transforms.

2. A method according to claim 1, characterized in the tabled function y(t) is integrated numerically from the value $t_a$ to the value $t_l$ of the argument by using equations (3) and (4), keeping the free variables s and σ, constant and then, for various values of σ while s remains constant, placing the transforms and their corresponding values of σ as value pairs in files, and using the value pairs to analyze the data.

3. A method according to claim 2, characterized in that zero is used as the initial value of σ and s.

4. A method according to claim 1, characterized in that the analysis is focused by selecting a window in the transformation curve, in which there is the outline of essentially only a single wave.

5. A method according to claim 4, characterized in that the analysis is carried out by giving σ various values while s remains constant and by using iteration to focus at the extreme value.

6. A method according to claim 1, further comprising the steps of:

using a reference point which is a function depicting a damping sine wave, which gives a value -y∞ for the argument value $t_0$ and the derivative of which for the same argument value is zero,:

$$y(t) = -y\infty e^{-\zeta(t-t_0)}\left\{\cos[\omega(t-t_0)] + \frac{\zeta}{\omega}\sin[\omega(t-t_0)]\right\} \qquad (5)$$

and the derivative of which is $$y = \frac{y\infty(\omega^2 + \zeta^2)}{\omega} e^{-\zeta(t-t_0)} \sin[\omega(t-t_0)] \qquad (6)$$

in which equations, ζ is the damping and ω is the angular velocity, by converting the expressions to an integral form, integrating and separating the real and imaginary components, deriving in relation to σ and using the partial derivatives obtained for further analysis and using them to solve the values of the arguments of extreme values.

7. An analyzer for analyzing and simulating various periodic phenomena, such as mechanical vibrations and variations in temperature, pressure, fluid flows, electric currents or electric tensions, comprising:

sensors for recording values of the desired quantities pertaining to the periodic phenomena, a computer device, connected to the sensors, for analyzing the values recorded by the sensors by using Laplace transformation, generated by replacing the Laplace variable s in the conventionally used Laplace transform (0):

$$f(s) = \int_{t_a}^{t_l} e^{-st} y(t) dt \qquad (0)$$

with the complex number s+iσ, giving:

$$f(s, \sigma) + i\varphi(s, \sigma) = \int_{t_a}^{t_l} e^{-(s+i\sigma)t} y(t) dt \qquad (2)$$

diving the transform (2) into real and imaginary components, reducing the imaginary component by i, giving two integral transforms (3) and (4):

$$f = \int_{t_a}^{t_l} e^{-st} y(t)\cos(\sigma t) dt \qquad (3)$$

and $$\varphi = -\int_{t_a}^{t_l} e^{-st} y(t)\sin(\sigma t) dt \qquad (4)$$

in which f and φ are transformation functions, t is the argument of the transformable function, y is a transformable function, s and σ are free variables, and $t_a$ and $t_l$ are the times of the start and end of the integral transformation, a display connected to the computer device for displaying results analyzed by the computer device and recording devices for recording the results obtained by the computer device.

* * * * *